United States Patent [19]

Mizutani et al.

[11] Patent Number: 4,767,170
[45] Date of Patent: Aug. 30, 1988

[54] OPTICAL DEFLECTOR DEVICE

[75] Inventors: Shuzo Mizutani; Kazunari Taki, both of Nagoya; Akihiro Suzuki, Nishio; Shoji Yamada, Aichi; Yumiko Watanabe, Gifu; Makoto Suzuki, Nagoya, all of Japan

[73] Assignee: Brother Kogyo Kabushiki Kaisha, Aichi, Japan

[21] Appl. No.: 931,039

[22] Filed: Nov. 17, 1986

[30] Foreign Application Priority Data

Nov. 20, 1985 [JP] Japan .................................. 60-260708
Dec. 27, 1985 [JP] Japan .................................. 60-299570

[51] Int. Cl.$^4$ .................................................. G02B 6/10
[52] U.S. Cl. .................................. 350/96.14; 350/96.13
[58] Field of Search ............... 350/96.11, 96.12, 96.13, 350/96.14

[56] References Cited

U.S. PATENT DOCUMENTS 4,415,226 11/1983 Verber et al. ..................... 350/96.14

FOREIGN PATENT DOCUMENTS

0115424 7/1983 Japan .................................. 350/96.14

Primary Examiner—Eugene R. LaRoche
Assistant Examiner—Steven J. Mottola
Attorney, Agent, or Firm—Parkhurst & Oliff

[57] ABSTRACT

An optical deflector device including a substrate having a thermo-optic effect, a two-dimensional optical waveguide formed on a surface of the substrate, for guiding a light beam therethrough, so as to trap the light beam in a direction of thickness of the substrate, and a device for producing a temperature gradient in the two-dimensional optical waveguide in a direction which is parallel to a plane of the substrate and which intersects the direction of propagation of the light beam through the optical waveguide. Also disclosed is an optical deflector device including a solid deflector element for deflecting a light beam, and an incident-angle changing device for progressively changing an angle of incidence of the light beam upon the solid deflector element. The incident-angle changing device includes a plurality of optical waveguides which are arranged so as to guide the light beam to the solid deflector element. The angle of incidence of the light beam upon the solid deflector element differs depending upon the optical waveguides through which the light beam is selectively guided to the solid deflector element.

10 Claims, 5 Drawing Sheets

OPTICAL DEFLECTOR DEVICE

BACKGROUND OF THE INVENTION

1. Field of the Invention

The present invention relates generally to an optical deflector for deflecting a light beam, and more particularly to techniques for improved deflecting speed and scanning resolution, and for increased angular range of deflection of the light beam.

2. Discussion of the Prior Art

Figure 3:
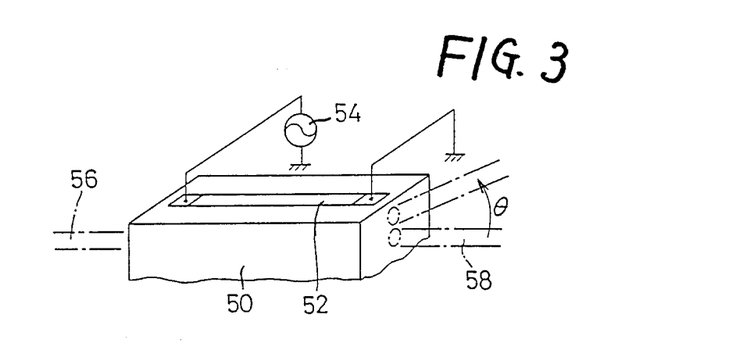
FIG. 3 is a view of an example of a known optical deflector device.

An optical deflector device utilizing a thermo-optic effect is known as a totally solid optical deflector which uses no mechanical moving parts. This totally solid optical deflector is higher in durability and smaller in size, than optical deflectors which include moving parts, for example, a polygon mirror or a hologram scanner. Further, the totally solid optical deflector device does not require complicated and expensive elements such as a frequency modulator capable of high-frequency modulation, or a ultrasonic transducer, as required in an optical deflector which operates utilizing an acousto-optical effect. An example of the totally solid optical deflector is shown in FIG. 3, wherein an electrically resistive heat-generating layer 52 is formed on a surface of a substrate 50 which has a thermo-optic effect. When the heat-generating layer 50 is energized with an electric power supplied from a power source 54, there is produced a temperature gradient in the substrate 50, in the direction of thickness. While no temperature gradient exists in the substrate 50, a light beam incident upon the substrate 50 propagates straight forward through the substrate 50, and is emitted as indicated at 58. However, when a temperature gradient is present in the substrate 50 in the direction of thickness, the incident light beam 56 is deflected in the direction of thickness of the substrate 50, at an angle corresponding to the temperature gradient formed in the substrate. The scanning resolution N of the deflector, i.e., the number of beam spots which form a scanning line, is generally expressed by the following Equation (1):

$$N = (2\pi/\lambda) \cdot \theta D \tag{1}$$

where, $\theta$: angle of deflection of light beam
$\lambda$: wavelength of light beam
D: cross sectional size of light beam, measured at the output end of the deflector, in the direction of deflection.

In the conventional optical deflector as shown in FIG. 3, the deflection angle $\theta$ is generally limited. To improve the resolution N, therefore, the size D of the light beam must be increased. This means that the thickness of the substrate must be increased to improve the resolution N. An increase in the substrate thickness results in an increase in the heat capacity of the substrate, which leads to an increased time required for forming a desired temperature gradient in the substrate. Thus, an increase in the substrate thickness for improvement in the resolution N will deteriorate the light deflecting speed of the optical deflector, which is one of the basic capabilities required on an optical deflector.

Also known is a totally solid optical deflector wherein the refractive index of an optical waveguide formed in the substrate is changed by utilizing an electro-optical, acousto-optical or thermo-optic effect. This type of optical deflector as presently available, which uses no mechanical moving parts, is also compact and sufficiently durable, but is still unsatisfactory in its capability of deflecting a light beam over a sufficiently wide angular range.

SUMMARY OF THE INVENTION

It is accordingly a first object of the present invention to provide a solid optical deflector device which are improved in its light deflecting speed and scanning resolution.

A second object of the present invention is the provision of an optical deflector device which is capable of deflecting a light beam over a sufficiently wide angular range.

The first object may be achieved according to one aspect of the present invention which provides a solid optical deflector device comprising a substrate having a thermo-optic effect, a two-dimensional optical waveguide formed on a surface of the substrate, for guiding a light beam therethrough in a direction of propagation along a length thereof, so as to trap the light beam in a direction of thickness of the substrate, and thermo-optic means for producing a temperature gradient in the two-dimensional optical waveguide in a direction which is parallel to a plane of the surface of the substrate and which intersects the direction of propagation of the light beam.

In the solid optical deflector device of the present invention constucted as described above, the light beam is subject to the temperature gradient produced by the thermo-optic means while the light beam propagates through the two-dimensional optical waveguide formed on the substrate. Since the optical waveguide formed on the substrate having a thermo-optic effect is given a gradient of refractive index corresponding to the temperature gradient, the light beam passing through the optical waveguide is deflected at an angle corresponding to the refractive index gradient. Accordingly, the angle of deflection of the light beam by the instant deflector device can be varied by changing the temperature gradient which is produced in the two-dimensional optical waveguide by the thermo-optical means.

Since the thermo-optic means is adapted to form the temperature gradient in the direction parallel to the plane of the substrate over which the thermo-optic means is disposed, the size of the substrate will not affect the speed at which the temperature gradient is formed or changed. Therefore, the light deflecting speed or response of the deflector device will not be deteriorated even if the width of the substrate is increased to obtain an increased cross sectional size of the light beam as measured in the deflecting direction or in the direction of width of the substrate, in order to improve the scanning resolution of the deflector device. In other words, the scanning resolution may be improved while maintaining a sufficiently high operating response.

Another advantage of the present invention is derived from the fact that the light beam passing through the two-dimensional optical waveguide is deflected in the direction of width of the substrate. That is, the instant arrangement permits a reduced thickness of the substrate, as compared with the conventional arrangement wherein the light beam is deflected in the direction of thickness of the substrate.

According to one feature of the invention, the thermo-optic means comprises a plurality of electrically resistive heat-generating elements disposed on the two-dimensional optical waveguide such that the heat-generating elements are spaced apart from each other by a predetermined distance in a direction perpendicular to the direction of propagation of the light beam. The thermo-optic means further comprises an electric power supply device for supplying an electric power to the heat-generating elements so as to form the temperature gradient. In this arrangement wherein the temperature gradient is produced by the heat generated by the plurality of heat-generating elements, the temperature gradient may be suitably formed relatively continuously over a comparatively wide area.

According to another feature of the invention, the thero-optic means comprises a two-dimensional electrically resisitive heat-generating element having a specific sheet resistivity which is constant in the direction of propagation of the light beam, and is continuously varied in a direction perpendicular to the direction of propagation. The thermo-optic means further comprises a power supply device for applying a voltage between opposite ends of the heat-generating element which are opposite to each other in the direction perpendicular to the direction of propagation. In this case, the temperature gradient may be formed more continuously.

The second object of the invention may be achieved according to another aspect of the invention which provides a deflector element for deflecting a light beam, and an incident-angle changing device for changing in steps or progressively an angle of incidence of the light beam upon the solid deflector element, the incident-angle changing device including a plurality of optical waveguides which are arranged so as to guide the light beam to the solid deflector element so that the angle of incidence upon the solid deflector element differs depending upon the optical waveguides through which the light beam is selectively guided to the solid deflector element.

In the optical deflector device constructed as described above, the light beam is guided to the solid deflector element through selected one of the plurality of optical waveguides of the incident-angle changing device, at the angle of incidence corresponding to the selected optical waveguide. The light beam incident upon the solid deflector element is deflected by this deflector element at a predetermined angle. Therefore, the total angle of deflection of the light beam by the deflector device is a sum of the angle of incidence upon the solid deflector element, and the angle of deflection by the solid deflector element. Thus, the present deflector device provides a relatively large angular range of deflection of the light beam, even if the angular range of deflection by the solid deflector element is relatively narrow. In addition, the instant deflector device may be made compact and is durable in operation, since it does not use any mechanical moving parts.

According to one feature of the above aspect of the present invention, the solid deflector element includes a substrate having a thermo-optic effect, a two-dimensional optical waveguide formed on a surface of the substrate, for guiding the light beam therethrough in a direction of propagation along a length thereof, so as to trap the light beam in a direction of thickness of the substrate, and thermo-optic means for producing a temperature gradient in the two-dimensional optical waveguide in a direction which is parallel to a plane of the surface of the substrate and which intersects the direction of propagation of the light beam. However, the solid deflector element may be electro-optical or acousto-optical means for deflecting the light beam by utilizing an electro-optical or acousto-optical effect.

According to another feature of the invention, the incident-angle changing device includes a substrate having an electro-optical effect, a pair of electrodes disposed on the substrate in spaced-apart relation with each other so as to permit the light beam from a light source to pass between the pair of electrodes, and an oblique electrode which disposed so as to extend between the pair of electrodes in a direction intersecting a path of the light beam. In this instance, one of a plurality of different voltages which correspond to the plurality of optical waveguides is selectively applied between the oblique electrode and the pair of electrodes, so as to deflect the light beam passing between the pair of electrodes so that the deflected light beam is directed into one of the plurality of optical waveguides which corresponds to the voltage applied.

According to a further feature of the invention, the solid deflector element and the incident-angle changing device use a common substrate, and the plurality of optical waveguides of the incident-angle changing device consists of three-dimensional optical waveguides formed on the common substrate. Alternatively, the incident-angle changing device and the solid deflector element may use two separate substrates. In this case, the plurality of optical waveguides of the incident-angle changing device consists of a plurality of optical fibers disposed so as to extend between the two substrates.

According to a still further feature of the invention, the incident-angle changing device further includes a plurality of laser sources which correspond to the plurality of optical waveguides and which are selectively energized to generate a laser beam. The laser sources are disposed such that the laser beams generated are received by the corresponding optical waveguides at one end thereof. The incident-angle changing device further includes a Fresnel lens portion adjacent to the other end of the plurality of optical waveguides and the solid deflector element. The laser beams emitted from the other end of the optical waveguides are directed to the solid deflector element through the Fresnel lens portion.

BRIEF DESCRIPTION OF THE DRAWINGS

The above and optional objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Referring to the accompanying drawings, the preferred embodiments of this invention will be described in detail.

Figure 1:
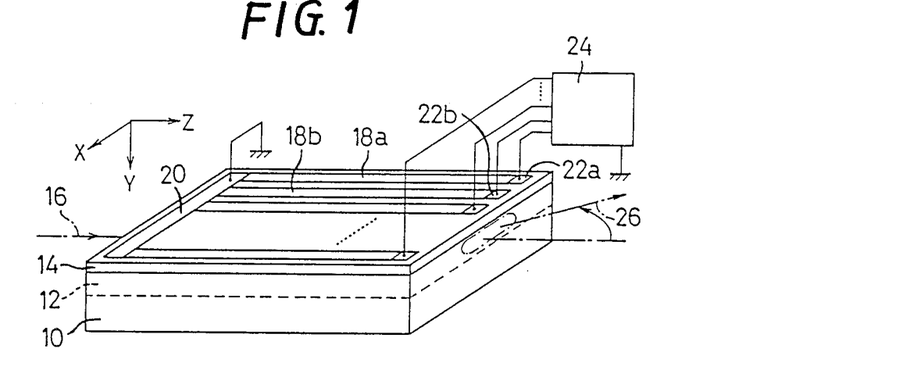
FIG. 1 is a perspective view of an arrangement of one embodiment of the present invention.

There is shown in FIG. 1 a totally solid optical deflector device which utilizes a thermo-optic effect. In the figure, reference numeral 10 designates a translucent substrate having a thermo-optic effect. This substrate 10 is formed of a material such as PLST and $LiNbO_3$. On one of opposite major surfaces of the substrate 10, there is formed a two-dimensional optical waveguide 12 which has a characteristic to causes waves of a ligth beam to be trapped in the direction of thickness of the substrate 10 (in a Y direction indicated in the figure), whereby the waves of light are guided, conducted or transmitted through the interior of the optical waveguide 12 in an X-Y plane (parallel to the plane of the substrate 10). This two-dimensional optical waveguide 12 consists of a layer of about 2-3 microns made of a material that has a higher refractive index than the material of the substrate 10. For example, the optical waveguide layer 12 is formed by diffusion of a suitable material such as Ti (titanium) through the material of the substrate 10 adjacent to its surface.

On the surface of the substrate 10 in which the optical waveguide 12 is formed, there is formed a buffer layer 14 made of a material such as $SiO_2$. On the buffer layer 14, there are disposed a plurality of elongate, electrically resistive, heat-generating elements 18a, 18b, etc. which extend parallel to a direction of propagation of an incident light beam 16 (in a Z direction indicated in the figure). These heat-generating elements 18 are spaced a suitable distance from each other in the direction (X direction) perpendicular to the direction of propagation of the light beam 16. The heat-generating elements 18 are formed of nichrome, cermet or other suitable electrically resistive materials, as elongate thin layers in the appropriate pattern on the substrate 10, by chemical vapor deposition, sputtering or other suitable techniques for applying such materials. The heat-generating elements 18a, 18b, etc. are electrically connected at their one end to an elongate electrically conductive common electrode 20, and at their other end to respective electrically conductive electrodes 22a, 22b, etc. These electrically conductive electrodes 20, 22 are formed on the buffer layers 14, by the same technique as used for the heat-generating elements 18, and are electrically connected to an electric power supply device 24 for energizing the heat-generating elements 18, in order to cause the elements 18 to generate heat. In the present embodiment, the heat-generating elements 18 have the same electric resistance, but are supplied with different amounts of electric power from the power supply device 24, so that the amounts of Joule heat generated by the heat-generating elements 18a, 18b, etc. are changed in the X direction perpendicular to the direction of propagation of the light beam 16, whereby the portion of the two-dimensional optical waveguide 12 adjacent to the heat-generating elements 18 is given a continuous temperature gradient in the X direction. Thus, the heat-generating elements 18, the electric power supply device 24, and the related components constitute thermo-optic means for producing a desired temperature gradient in the two-dimensional optical waveguide 12 in the direction of width of the substrate 10. The electric power supply device 24 is operated under the control of light-deflection signals from a control unit (not shown), so that the desired temperature gradient is established in the two-dimensional optical waveguide 12.

The operation of the present optical deflector device will be described.

The light beam 16 such as a laser beam produced by a light source (not shown) is condensed by a suitable condensing means such as a cylindrical lens, into a flat beam, which is incident upon one of opposite longitudinal ends of the substrate 10. The incident light beam 16 is guided in the Z direction indicated in FIG. 1, through the two-dimensional optical waveguide 12, and emitted from the other longitudinal end of the substrate 10, as indicated at 26. When no power is applied from the electric power supply device 24 to the heat-generating elements 18a, 18b, etc., a temperature gradient is not formed within the optical waveguide 12, whereby the emitted light beam 26 runs in the same direction as the incident light beam 16. When controlled different amounts of electric power are applied to the respective heat-generating elements 18, however, an appropriate temperature gradient is formed within the two-dimensional optical waveguide 12, whereby the optical waveguide 12 is given a gradient of refractive index in the X direction perpendicular to the direction of propagation of the light beam 16 through the optical waveguide 12. That is, the refractive index of the optical waveguide 12 is varied progressively or continuously in the X direction, according to the temperature gradient formed by the heat-generating elements 18. As a result, the light beam 12 passing through the optical waveguide 12 is subject to deflection due to the gradient of the refractive index, whereby the light beam 26 emitted from the output end of the optical waveguide 12 is deflected in the X-Z plane, with respect to the Z direction (direction of propagation of the incident light beam 16), at an angle corresponding to the specific gradient of refractive index of the optical waveguide 12 in the X direction. This angle of deflection of the emitted light beam 26 can be changed or controlled by changing the temperature gradient of the optical waveguide 12 by means of changing the amounts of electric power applied from the power supply device 24 to the individual heat-generating elements 18. The deflected light beam 26 reaches the surface of an object, through a cylindrical lens or other means which serves to convert the flat beam 26 into a beam having a circular cross section. According to this arrangement, by periodically changing the temperature gradient of the optical waveguide 12, the deflection angle of the emitted light beam 26 may be changed, and therefore the surface of the object is swept or scanned by the beam spots moved on the surface. Thus, a scanning line is formed on the object surface by the light beam 26 which is deflected by the instant deflector over a predetermined angular range.

As described above, the light beam 16 incident upon the end face of the substrate 10 is passed through the two-dimensional optical waveguide 12 formed on one of the major surfaces of the substrate 10, and the light beam 16 passing through the optical waveguide 12 is subjected to the temperature gradient formed therein by the heat-generating elements 18. In this connection, it is noted that the temperature gradient is formed in the portion of the optical waveguide 12 which is right below the array of the heat-generating elements 18. This means a short response time of the deflector device, between the moment at which the amounts of electric power to the heat-generating elements 18 are changed, and the moment at which the angle of deflection of the emitted light beam 26 is changed. Hence, the light deflecting speed of the deflector device, one of the basic capabilities of the device required, will not be influenced by the size of the deflected light beam 26 in the direction of deflection, i.e., by the width of the substrate 10. As is understood from the previously indicated Equation (1), the resolution N of the scanning line formed by the deflected light beam 26 is improved by increasing the size of the light beam 26 in the direction of deflection. This size is increased by increasing the width of the substrate 10, which increases the heat capacity of the substrate. However, since the temperature gradient is formed in the direction of width of the substrate, the light deflecting speed is not affected by the heat capacity of the substrate 10. Therefore, the present light deflector device may have improved resolution while maintaining a high light deflecting speed.

Further, the present deflector device is available with the substrate 10 having a smaller thickness than a substrate used in the conventional device wherein the incident light beam is deflected in the direction of thickness of the substrate. In other words, the substrate 10 may be relatively thin, because the light meam 16 passing through the optical waveguide 12 is deflected in the plane of the substrate 10, due to the temperature gradient of the two-dimensional optical waveguide 12 formed on one surface of the substrate 10. This is also an advantage of the instant deflector device.

Another embodiment of the present invention will be described referring to FIG. 2. In the interest of brevity and simplification, the same reference numerals as used in FIG. 1 are used in FIG. 2 to identify the corresponding components.

Figure 2:
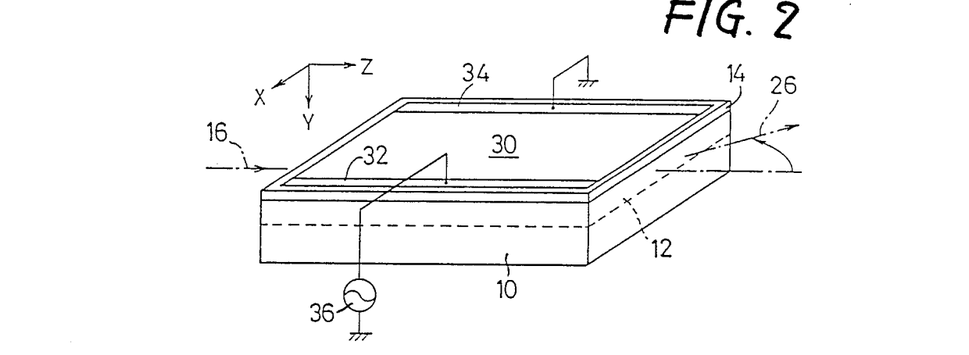
FIG. 2 is a view corresponding to FIG. 1, showing another embodiment of the invention.

In FIG. 2, there is shown a two-dimensional electrically resistive element in the form of an elongate layer 30 which is formed on the two-dimensional optical waveguide 12. This electrically resistive layer 30 has a specific sheet resistivity which is constant in the Z direction (direction of propagation of the light beam 16), but is continuously or progressively varied in the X direction perpendicular to the Z direction. The sheet resistivity is the resistivity of a sheet of material measured in ohms per square. A pair of elongate electrodes 32, 34 are formed on the electrically resistive layer 30 along its edges at the opposite transverse ends (at the ends in the X direction). When a voltage is applied from an electric power supply device 36 between these two electrodes 32, 34, an amount of heat generated per unit area of the electrically resistive layer 30 is continuously changed in the X direction, due to the continuous change in the sheet resistivity of the layer 30, whereby a temperature gradient is formed within the two-dimensional optical waveguide 12, in the X direction. In this embodiment, the electrically resistive layer 30, the electric power supply device 36, etc. constitute thermo-optic means for producing or forming a temperature gradient within the optical waveguide 12. According to this arrangement, a periodic change in the voltage supplied from the power supply device 36 will cause a periodic change in the temperature gradient to be formed within the optical waveguide 12, whereby the angle of deflection of the emitted light beam 26 is periodically changed. Therefore, the instant embodiment have the same advantages as offered by the preceding embodiment.

A further embodiment of the present invention will be described, referring to FIG. 4 wherein a two-dimensional optical waveguide 112 is formed on one of opposite major surfaces of a substrate 110 which is about 0.5 mm thick and made of a single crystal of an electro-optical material such as $LiNbO_3$. The two-dimensional optical waveguide 112 has a higher refractive index than the material of the substrate 110, thus exhibiting a characteristic that causes the light beam to be trapped in the direction of thickness of the optical waveguide 112. Thus, the light beam 116 is guided through the optical waveguide 112. For example, the optical waveguide 112 is formed as a comparatively thin layer having a thickness of a few microns or so, by diffusion of Ti (titanium) through the material of the substrate 110 adjacent to the surface. The substrate 110 and the layer of the optical waveguide 112 are integral with each other, the refractive index being varied continuously. The boundary between the substrate and the optical waveguide is indicated in broken line in FIG. 4.

A semiconductor laser source in the form of a chip 114 is attached to one of opposite end faces of the substrate 110, so that a laser beam is emitted by the semiconductor chip 114 in the direction parallel to a centerline C of the substrate 110. While the emitted laser beam passes through the optical waveguide 112, the laser beam is condensed by a first Fresnel lens portion 116 into parallel rays, and the condensed laser beam is deflected by a first deflector portion or element 118 at selected one of a plurality of deflection angles, as described below in detail. The deflected laser beam is transmitted to a second Fresnel lens portion 122 through corresponding one of a plurality of three-dimensional optical waveguides 120a, 120b, 120c, etc. which are disposed so as to extend between the first deflector portion 118 and the second Fresnel lens portion 122. The three-dimensional optical waveguides 120 are so arranged that the distance between the centerline C and the point of incidence of the laser beam from the optical waveguides 120 upon the second Fresnel lens portion 120, corresponds the angle of deflection of the laser beam by the first deflector portion 118. The laser beam incident upon the second Fresnel lens portion 122 is refracted thereby, and is then further deflected by a second deflector portion or element 124 by an additional angle. Thus, a desired total angle of deflection of the laser beam is eventually obtained.

The first and second Fresnel lens portions 116 and 122 are formed in the two-dimensional optical waveguide 112, in the form of a Fresnel lens, by local titanium diffusion or proton replacement, or other techniques, so as to give the Fresnel lens portions a higher refractive index than the material of the optical waveguide 112. These Fresnel lens portions 116, 122 may be replaced by geodesic lenses by forming concave portions in the two-dimensional optical waveguide 112.

The first deflector portion 118 comprises a buffer layer 132 formed on the optical waveguide 112, and electrodes 126, 128 and 130 disposed on the buffer layer 132. The buffer layer 132 is a layer having a few microns, which is formed of $SiO_2$, or other transparent materials having a lower refractive index than the material of the optical waveguide 112. While this buffer layer 132 is provided for preventing the electrodes 126, 128, 130 from absorbing the light passing through the optical waveguide 112, the provision of the buffer layer 132 is not essential. The electrodes 126 and 128 are disposed on the opposite sides of the centerline C, with a suitable spacing therebetween. The third electrode 130 has an elongate oblique portion which extends between the first and second electrodes 126 and 128, so as to intersect the centerline C. If the substrate 110 is made of a Y-cut single crystal of $LiNbO_3$, for example, a variation $\Delta n$ in refractive index of a portion of the substrate 110 between the electrodes 126 and 128 is obtained from the following Equation (2):

$$\Delta n = (\tfrac{1}{2}) n_e^3 r_{33} \cdot E \qquad (2)$$

where, $n_e$: refractive index of the substrate 110 with respective to abnormal light;

$r_{33}$: electro-optical constant of the substrate in the direction parallel to its plane and perpendicular to the centerline C; and E: magnitude of an electric field produced by the electrodes 126, 128, 130.

Figure 5:
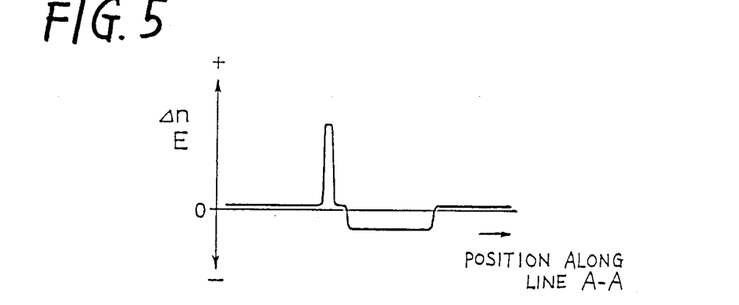
FIGS. 5, 6 and 7 are graphical representations showing distributions of an electric field or variation in refractive index at a first deflector portion of the arrangement of FIG. 4.
Figure 6:
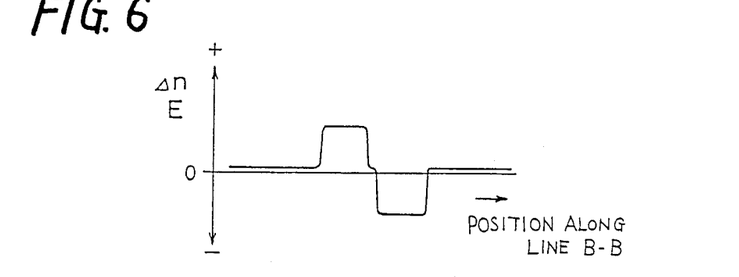
Figure 7:
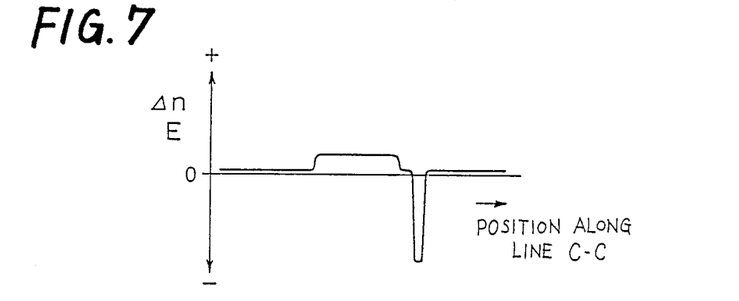
Figure 8:
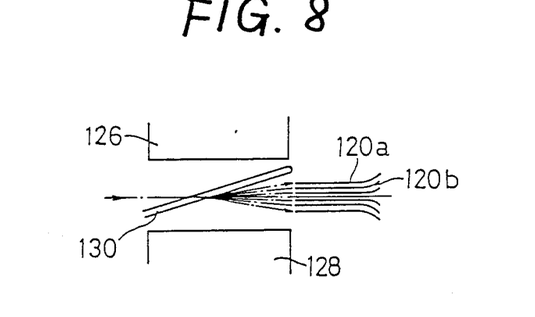
FIG. 8 is a view illustrating a relationship between the first deflector portion and three-dimensional optical waveguides of the embodiment of FIG. 4.

It will be understood from the above Equation, that the distribution of the refractive index, i.e., the distribution of the refractive index variation $\Delta n$ in the direction perpendicular to the centerline C is changed with the distribution of the magnitude of an electric field E produced between the electrodes 126, 128. For example, when a positive voltage is applied to the electrode 130 while an earth voltage is applied between the electrodes 126, 128, the electric field E and the refractive index variation $\Delta n$ at positions A—A, B—B and C—C of the first deflector portion 118 have the distributions as indicated by graphs of FIGS. 5, 6 and 7, respectively. In this condition, therefore, the rays of the laser beam transmitted parallel to the centerline C are subject to different average refractive indexes while passing through the first deflector portion 118. Consequently, the laser beam is deflected on one side of the centerline C which is higher in the refractive index than the other side. In this arrangement, the laser beam passing through the first deflector portion 118 is deflected at a varying angle, by changing in steps the voltage to be applied between the electrode 130, and the electrodes 126, 128, as a function of time. Accordingly, the currently deflected laser beam is directed into one of the three-dimensional optical waveguides 120a, 120b, 120c, etc. which corresponds to the specific angle of deflection of the laser beam. In connection with the graphical representations in FIGS. 5 through 7, it is noted that the positive side of the electric field E corresponds to the lower side of the centerline C, as seen in FIG. 8, and that the positions along lines A—A, B—B and C—C are viewed in the direction from the second deflector portion 124 toward the first deflector portion 118.

Figure 9:
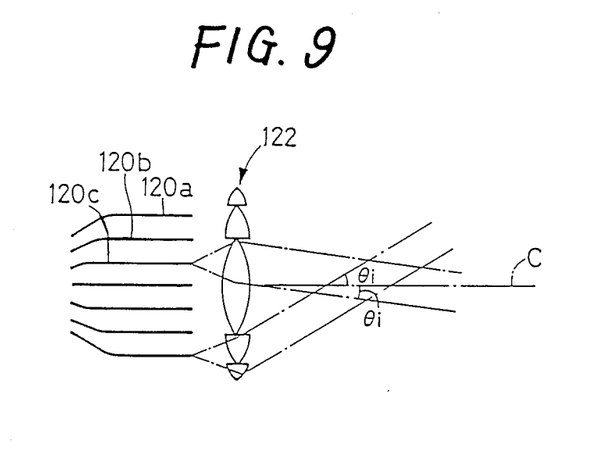
FIG. 9 is a view illustrating a relationship between the three-dimensional optical waveguides and a second Fresnel lens portion of the embodiment of FIG. 4.

The three-dimensional optical waveguides 120a, 120b, 120c, etc. are formed in the two-dimensional optical waveguide 112, along the desired light paths, by diffusion of Ti or other material, so that the optical waveguides 120 have a higher refractive index than the optical waveguide 112. Further, each optical waveguide 120 is formed so that the refractive index increases toward the middle of the width and toward the surface of the optical waveguide 120. As shown in FIG. 8, the ends of the optical waveguides 120 adjacent to the first deflector portion 118 are positioned substantially on a straight line aligned with the right-hand side edges of the pair of opposed electrodes 126, 128 (as viewed in FIG. 8), such that the corresponding end portions of the optical waveguides 120 are spaced apart from each other along the straight line, the positions of those end portions corresponding to different angles of deflection of the laser beam by the first deflector portion 118. In this arrangement, the laser beam currently deflected at a given angle is incident upon the end of the appropriate one of the three-dimensional optical waveguides 120 which corresponds to that angle of deflection. The optical waveguides 120 extend toward the second Fresnel lens portion 122, so that the other ends are spaced from the centerline C by different distances in the opposite directions away from the centerline C, perpendicular to the centerline. While the seven three-dimensional optical waveguides 120 are shown in FIGS. 4, 8 and 9 for easy understanding, the number of the optical waveguides 120 may be more than seven.

The output end portions of the three-dimensional optical waveguides 120 extend parallel to the centerline C. The laser beam emitted from the output end of each optical waveguide 120 is incident upon the second Fresnel lens portion 122. Since the laser beam is refracted by the second Fresnel lens portion 122 as indicated in FIG. 9, the angle of incidence of the laser beam upon the second deflector portion 124 (angle with respect to the centerline C) differs depending upon the position of the end of the appropriate optical waveguide 120 from which the laser beam is emitted, that is, depending upon the distance of the end of that optical waveguide 120 from the centerline C. As illustrated in FIG. 9, the second Fresnel lens portion 122 also functions to condense the laser beam from the optical waveguides 120 into parallel rays. In the present embodiment, the first deflector portion 118, the three-dimensional optical waveguides 120 and the second Fresnel lens portion 122, constitute an incident-angle changing device adapted to change in steps the angle of incidence of the laser beam upon the second deflector portion 124.

The second deflector portion 124 includes: a buffer layer 134 similar to the buffer layer 132; a multiplicity of elongate electrically resistive heat-generating elements 136a, 136b, 136c, etc. disposed on the buffer layer 134 and extending parallel to the centerline C; an elongate common electrode 138 connected to the ends of the heat-generating elements 136 remote from the second Fresnel lens portion 122; and a multiplicity of electrodes 140a, 140b, 140c, etc. connected to the other ends of the heat-generating elements 136, respectively. The heat-generating elements 136 have the same electrical resistance. When different voltages are applied between the common electrode 138, and the electrodes 140, the heat-generating elements 136 generate different amounts of Joule heat corresponding to the different voltages applied thereto. As a result, the portion of the two-dimensional optical waveguide 12 adjacent to its surface (on which the elements 136 are formed) is given a temperature gradient in the direction perpendicular to the direction of propagation of the laser beam through the optical waveguide 112, i.e., in the direction perpendicular to the centerline C. This temperature gradient establishes a corresponding gradient of refractive index of the second deflector portion 124 (causes the deflector portion 124 to have a continuously varying refractive index), whereby the laser beam propagating through the second deflector portion 124 is deflected due to the refractive index gradient. Thus, the second deflector portion 124 is capable of deflecting the laser beam at a continuously varying angle depending upon the position of incidence in the direction perpendicular to the centerline C. Therefore, the laser beam incident upon the instant deflector device is deflected by a total deflection angle θH which is a sum of the angle of incidence upon the second deflector portion 118, and the angle of deflection by the second deflector portion 118. In this embodiment, the second deflector portion 124 serves as a solid optical deflector element.

The electrically resistive heat-generating elements 136a, 136b, 16c, etc. are formed as elongate layers, by applying a suitable electrically resistive material such as nickel-chrome alloy or cermet, by chemical vapor deposition, sputtering or other suitable techniques. The previously indicated electrodes 126, 128, 130, 138 and 140a, 140b, 140c, etc. are formed with similar techniques, by using an electrically conductive material such as aluminum. Adjacent to the output end of the substrate 110, a converging lens 142 is provided for converging the deflected laser beam emitted from the substrate 110, in the direction of thickness of the substrate 110.

The operation of this modified embodiment of the invention will be described.

According to a desired angle of deflection of the laser beam by the first deflector portion 118, an apporpirate one of a plurality of predetermined voltages is applied between the electrode 130 and the electrodes 126, 128, from a suitable driver circuit (not shown). As a result, the laser beam passing through the first deflector portion 118 is deflected at that desired angle corresponding to the voltage applied to the electrodes 126, 128, 130. The deflected laser beam is transmitted to the second Fresnel lens portion 122 through the appropriate one of the three-dimensional optical waveguides 120a, 120b, 120c, etc., which corresponds to the applied voltage. The laser beam passing through the second Fresnel lens portion 122 is incident upon the second deflector portion 124 at an angle θi corresponding to the three-dimensional optical waveguide 120 through which the laser beam is transmitted to the second Fresnel lens portion 122. In the meantime, suitably selected progressively changing voltages are applied between the common electrode 138, and the electrodes 140a, 140b, 140c, etc. of the second deflector portion 124. This set of voltages is determined to provide a temperature gradient required to provide a desired range of angle of deflection of the laser beam by the deflector device. The laser beam incident upon the second deflector portion 124 is deflected thereby, and emitted from the output end of the optical waveguide 112 at an angle θH determined by the temperature gradient established in the deflector portion 124.

Although the angular range of deflection by the second deflector portion 124 is not so large, the total deflection angle θH available on the present deflector device is varied over a relatively wide range, since the total deflection angle θH is a sum of the angle of deflection by the second deflector portion 124, and the angle of incidence of the laser beam upon the second deflector portion 124, this latter incident angle corresponding to the angle of deflection by the first deflector portion 118 which is varied by changing the voltage between the electrodes 126, 128 and the electrode 130, as a function of time, so as to cover the angular range of deflection by the first deflector portion 118. The present optical deflector device using the two deflector portions 118, 124 is therefore capable of providing the total deflection angle θH over a relatively wide range, without using any mechanical moving parts.

Modified arrangements of the embodiment of FIG. 4 will be described, referring to FIGS. 10 and 11. The same reference numerals as used in FIG. 4 will be used in these figures to identify the corresponding elements, and repeated description thereof will not be provided.

Figure 10:
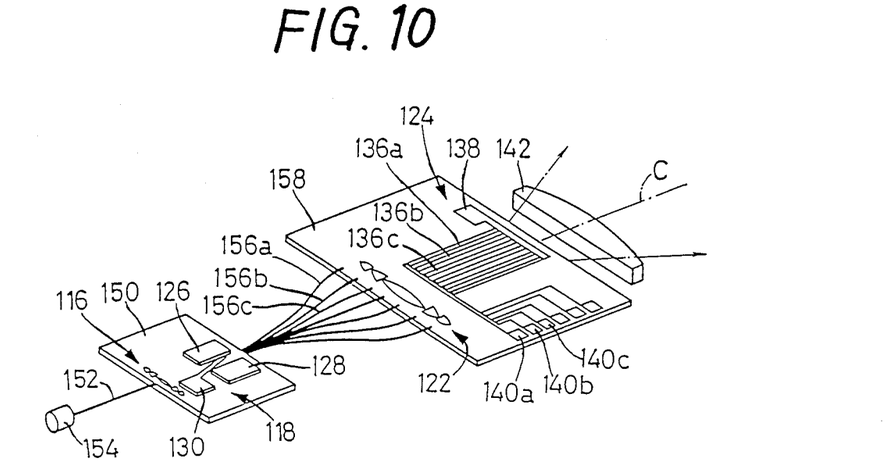
FIGS. 10 and 11 are views corresponding to that of FIG. 4, showing further embodiments of this invention.

While the light source in the form of the semiconductor laser chip 114, and the first and second deflector portions 118, 124 are integrally disposed on the single substrate 10 in the preceding embodiment, these elements may be disposed on separate substrates, as shown in FIG. 10. In the figure, reference numeral 150 designates a first substrate which supports thereon the first deflector portion 118 adapted to receive the laser beam from a laser source 154 through a first optical fiber 152. The laser beam received and deflected by the first deflector portion 118 is transmitted through one of a plurality of second optical fibers 156a, 156n, 156c, etc., to the second Fresnel lens portion 122 disposed on a second substrate 158. The laser beam incident upon the second Fresnel lens portion 122 is emitted to the second deflector portion 124 also disposed on the second substrate 158, at an angle of incidence which corresponds to the angle of deflection by the first deflector portion 118. The laser beam incident upon the second deflector portion 124 is deflected thereby, and emitted from the output end of the second substrate 158. In the present embodiment, the first deflector portion 118, the second optical fibers 156 and the second Fresnel lens portion 122 constitute an incident-angle changing device for changing the angle of incidence of the laser beam upon the second deflector portion 124.

Figure 11:
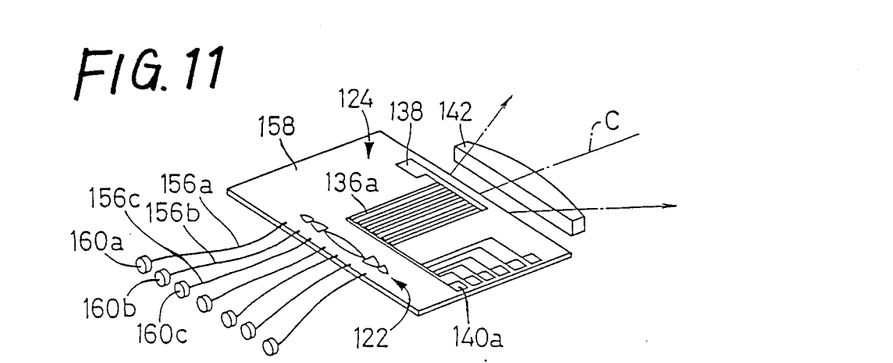

The laser source 154, and the first deflector portion 118 on the first substrate 150, used in the embodiment of FIG. 10 may be replaced by a plurality of laser sources 160a, 160b, 160c, etc. coupled to the input ends of the respective optical fibers 156a, 156b, 156c, etc., as shown in FIG. 11. The laser sources 160 are selectively energized, to provide the second deflector portion 124 with a laser beam which has a varying angle of incidence depending upon the energized laser source 160. In this alternative arrangement, the laser sources 160, the optical fibers 156 and the second Fresnel lens portion 122 constitute an incident-angle changing device for changing the angle of incidence of the laser beam upon the second deflector portion 124. The total angle of deflection of the laser beam obtained in this embodiment is a sum of the angle of incidence upon the second deflector portion 124, which is controlled by the selective energization of the laser sources 160, and the angle of deflection by the second deflector portion 124. Thus, the present optical deflector is also capable of deflecting the laser beam over a relatively wide range. While the present embodiment is adapted to energize only one of the laser sources 160 at one time, it is possible that two or more of the laser sources 160 are simultaneously energized so that two or more laser beams sweep the same scanning line on the surface of an object.

While the present invention has been described in its preferred embodiments, it is to be understood that various changes, modifications and improvements may be made in the invention.

Figure 4:
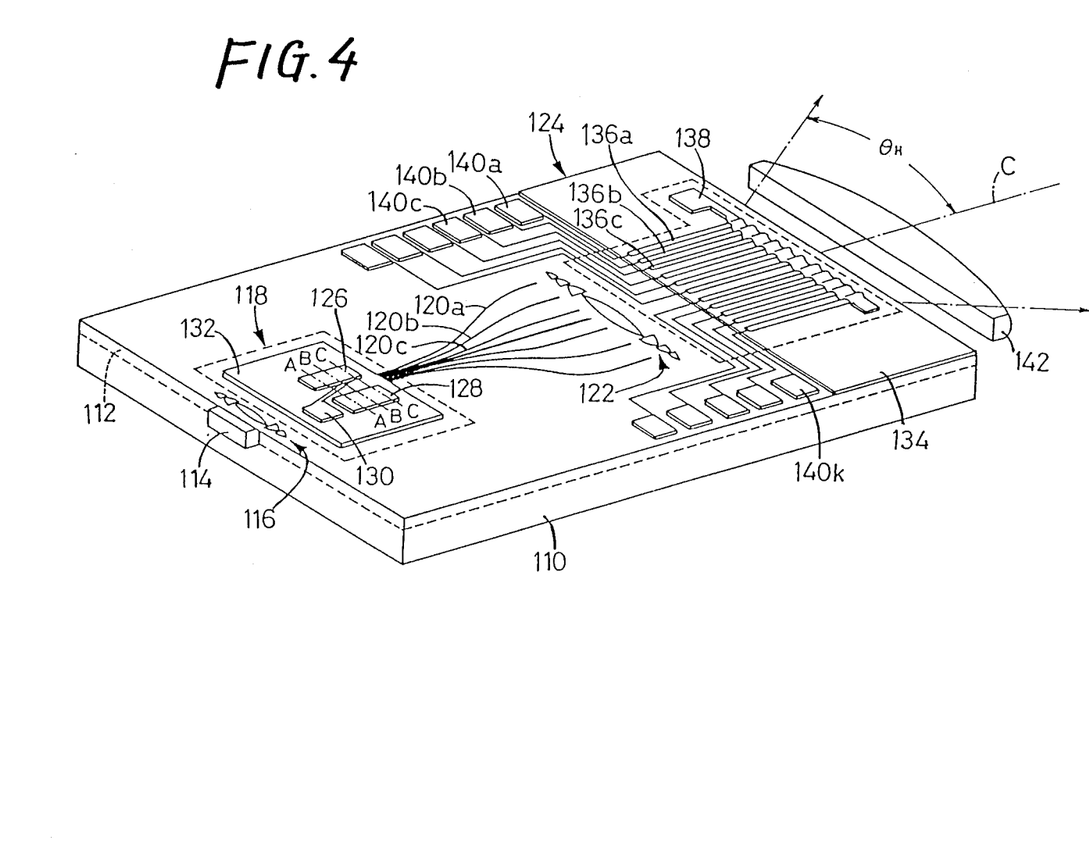
FIG. 4 is a perspective view of an arrangement of a further embodiment of the invention.

For example, the second deflector portion 124 of FIGS. 4, 10 and 11 which utilizes a thermo-optic effect may be replaced by a deflector portion which is adapted to deflect a light beam by utilizing an electro-optical effect, like the first deflector portion 118, or by any other types of optical deflector element such as an element utilizing an acousto-optical effect. Further, the first deflector portion 118 may be replaced by an optical deflector element utilizing a thermo-optic effect or an acousto-optical effect.

Further, the first deflector portion 118 may be replaced by an arrangement disclosed in U.S. patent application Ser. No. 892,250 filed Aug. 4, 1986, assigned to the assignee of the present application, wherein a three-dimensional optical waveguide has a plurality of branch paths angled to a main path, and a plurality of deflector electrodes for deflecting a light beam from the main path into the branch paths.

The second Fresnel lens portion 122 used in the embodiments of FIGS. 10 and 11 may be replaced by a plurality of convex lenses disposed opposite to the corresponding optical fibers 156, such that the optical axes of these convex lenses are inclined at different angles so that the angle of inclination is varied with the distance of the convex lenses from the centerline C.

It is to be understood that the present invention has been described and shown for illustrative purpose only, and that other changes, modifications and improvements may be made in the invention, without departing from the spirit and scope of the invention defined in the following claims.

What is claimed is:

1. A solid optical deflector device comprising:
    a substrate having a thermo-optic effect;
    a two-dimensional optical waveguide formed on a surface of the substrate, for guiding a light beam therethrough in a plane parallel to said surface of the substrate in a direction of propagation along a length thereof; and
    thermo-optic means for producing a temperature gradient in said two-dimensional optical waveguide in a direction which is parallel to said plane and which intersects said direction of propagation of the light beam, said thermo-optic means comprising a plurality of electrically resistive heat-generating elements disposed on said two-dimensional optical waveguide and spaced apart from each other by a predetermined distance in a direction perpendicular to said direction of propagation of the light beam, said thermo-optic means further comprising an electric power supply device for selectively supplying controlled amounts of electric power to respective heat-generating elements to change said temperature gradient, thereby changing an angle of deflection of said light beam by the deflector device.

2. A solid optical deflector device according to claim 1, wherein said thermo-optic means comprises a two-dimensional electrically resisitive heat-generating element having a specific sheet resistivity which is constant in said direction of propagation of the light beam, and progressively varied in a direction perpendicular to said direction of propagation, said thermo-optic means further comprising a power supply device for applying a voltage between opposite ends of said heat-generating element which are opposite to each other in the direction perpendicular to said direction of propagation.

3. An optical deflector device comprising a solid deflector element for deflecting a light beam, and an incident-angle changing device for changing in steps an angle of incidence of the light beam upon said solid deflector element, said incident-angle changing device including a plurality of optical waveguides which are arranged so as to guide the light beam to said solid deflector element so that the angle of incidence upon said solid deflector element differs depending upon the optical waveguides through which the light beam is selectively guided to said solid deflector element.

4. An optical deflector device according to claim 3, wherein said solid deflector element includes a substrate having a thermo-optic effect, a two-dimensional optical waveguide formed on a surface of the substrate, for guiding the light beam therethrough in a plane parallel to said surface of the substrate in a direction of propagation along a length thereof, and thermo-optic means for producing a temperature gradient in said two-dimensional optical waveguide in a direction which is parallel to said plane and which intersects said direction of propagation of the light beam.

5. An optical deflector device according to claim 3, wherein said incident-angle changing device includes a substrate having an electro-optical effect, a pair of electrodes disposed on said substrate in spaced-apart relation with each other so as to permit the light beam from a light source to pass between said pair of electrodes, and an oblique electrode which disposed so as to extend between said pair of electrodes in a direction intersecting a path of the light beam, one of a plurality of different voltages which correspond to said plurality of optical waveguides being selectively applied between said oblique electrode and said pair of electrodes, so as to deflect the light beam passing between said pair of electrodes so that the deflected light beam is directed into one of said plurality of optical waveguides which corresponds to the voltage applied.

6. An optical deflector device according to claim 3, wherein said solid deflector element and said incident-angle changing device comprise a common substrate, said plurality of optical waveguides of said incident-angle changing device consisting of three-dimensional optical waveguides formed on said common substrate.

7. An optical deflector device according to claim 3, wherein said incident-angle changing device comprises a first substrate, and said solid deflector element comprises a second substrate separate from said first substrate, said plurality of optical waveguides of said incident-angle changing device consisting of a plurality of optical fibers disposed so as to extend between said first and second substrates.

8. An optical deflector device according to claim 3, wherein said incident-angle changing device further includes a plurality of laser sources which correspond to said plurality of optical waveguides and which are selectively energized to generate a laser beam, said laser sources being disposed such that the laser beams generated are received by the corresponding optical waveguides at one end thereof, said incident-angle changing device further including a Fresnel lens portion adjacent to the other end of said plurality of optical waveguides and said solid deflector element, the laser beams emitted from said other end of said optical waveguides being directed to said solid deflector element through said Fresnel lens portion.

9. A solid optical deflector device for deflecting a laser beam, comprising:
    a common substrate having a two-dimensional optical waveguide for guiding the laser beam therethrough in a plane parallel to said surface of the substrate;

a light source in the form of a semiconductor laser chip attached to one end face of said common substrate, for producing the laser beam so as to be guided through said two-dimensional optical waveguide;

a first lens formed on said common substrate, for condensing the laser beam into parallel rays;

a first deflector element disposed on said common substrate, for deflecting said parallel rays of the laser beam from said first lens, at one of a plurality of different angles, by utilizing an electro-optical effect;

a plurality of three-dimensional optical waveguides formed on said common substrate, corresponding to said plurality of different angles, said three-dimensional optical waveguides receiving at one end thereof the laser beams which have been deflected by said first deflector element at said plurality of different angles, respectively;

a second lens formed on said common substrate, for deflecting the laser beams emitted from the other end of said three-dimensional optical waveguides, angles of deflection by said second lens corresponding to distances between a center of said second lens, and points at which the laser beams are incident upon the second lens; and a second deflector element disposed on said common substrate, for deflecting the laser beams from said second lens, at a predetermined angle, by utilizing an electro-optical effect.

10. A solid optical deflector device comprising:

a substrate having a thermo-optic effect;

a two-dimensional optical waveguide formed on a surface of the substrate, for guiding a light beam therethrough in a plane parallel to said surface of the substrate in a direction of propagation along a length thereof; and thermo-optic means for producing a temperature gradient in said two-dimensional optical waveguide in a direction which is parallel to said plane and which intersects said direction of propagation of the light beam, said thermo-optic means comprising a two-dimensional electrically resistive heatgenerating element having a specific sheet resistivity which is constant in said direction of propagation of the light beam, and progressively varied in a direction perpendicular to said direction of propagation, said thermo-optic means further comprising a power supply device for applying a voltage between opposite ends of said heatgenerating element which are opposite to each other in the direction perpendicular to said direction of propagation.

* * * * *